March 23, 1943.    J. R. KIEL    2,314,834
SOUND ON FILM
Original Filed Oct. 27, 1938    9 Sheets-Sheet 1

INVENTOR.
John Ripley Kiel,
BY Cromwell, Greist + Warden
ATTORNEYS.

March 23, 1943.　　　　J. R. KIEL　　　　2,314,834
SOUND ON FILM
Original Filed Oct. 27, 1938　　9 Sheets-Sheet 4

INVENTOR.
John Ripley Kiel,
BY Cromwell, Greist & Warden
Attys.

March 23, 1943. J. R. KIEL 2,314,834
SOUND ON FILM
Original Filed Oct. 27, 1938 9 Sheets-Sheet 5
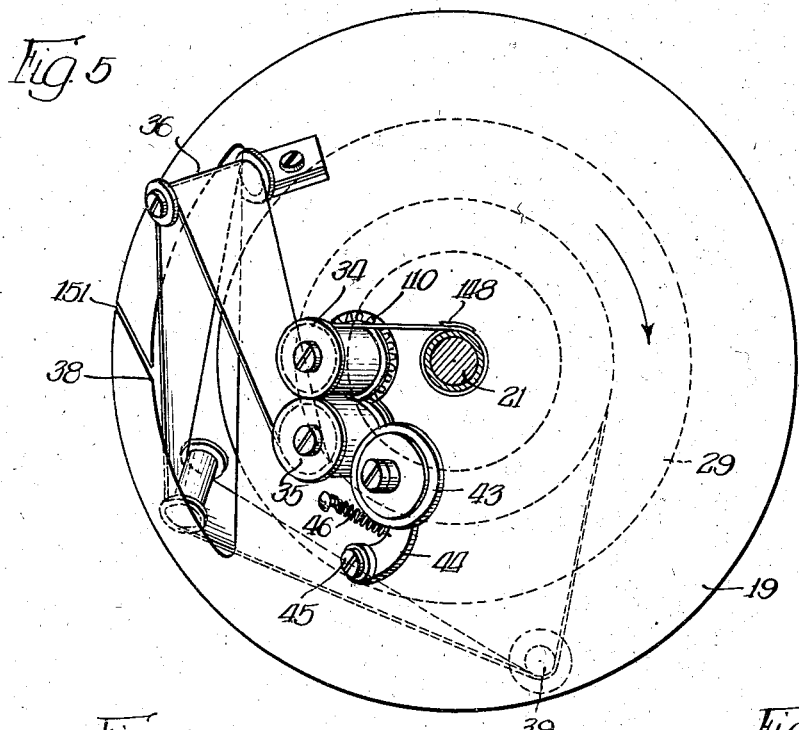
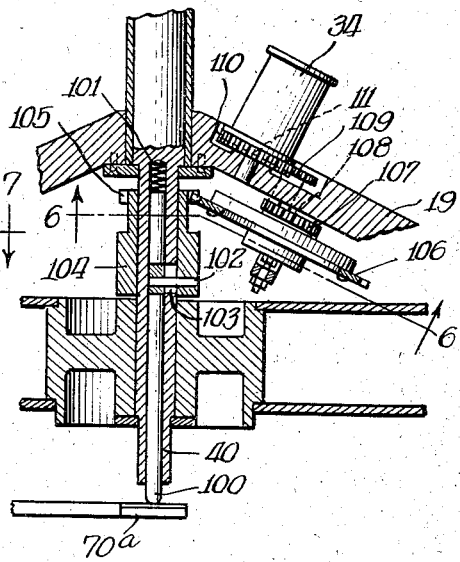
INVENTOR.
John Ripley Kiel,
BY Cromwell, Greist & Warden
Attys

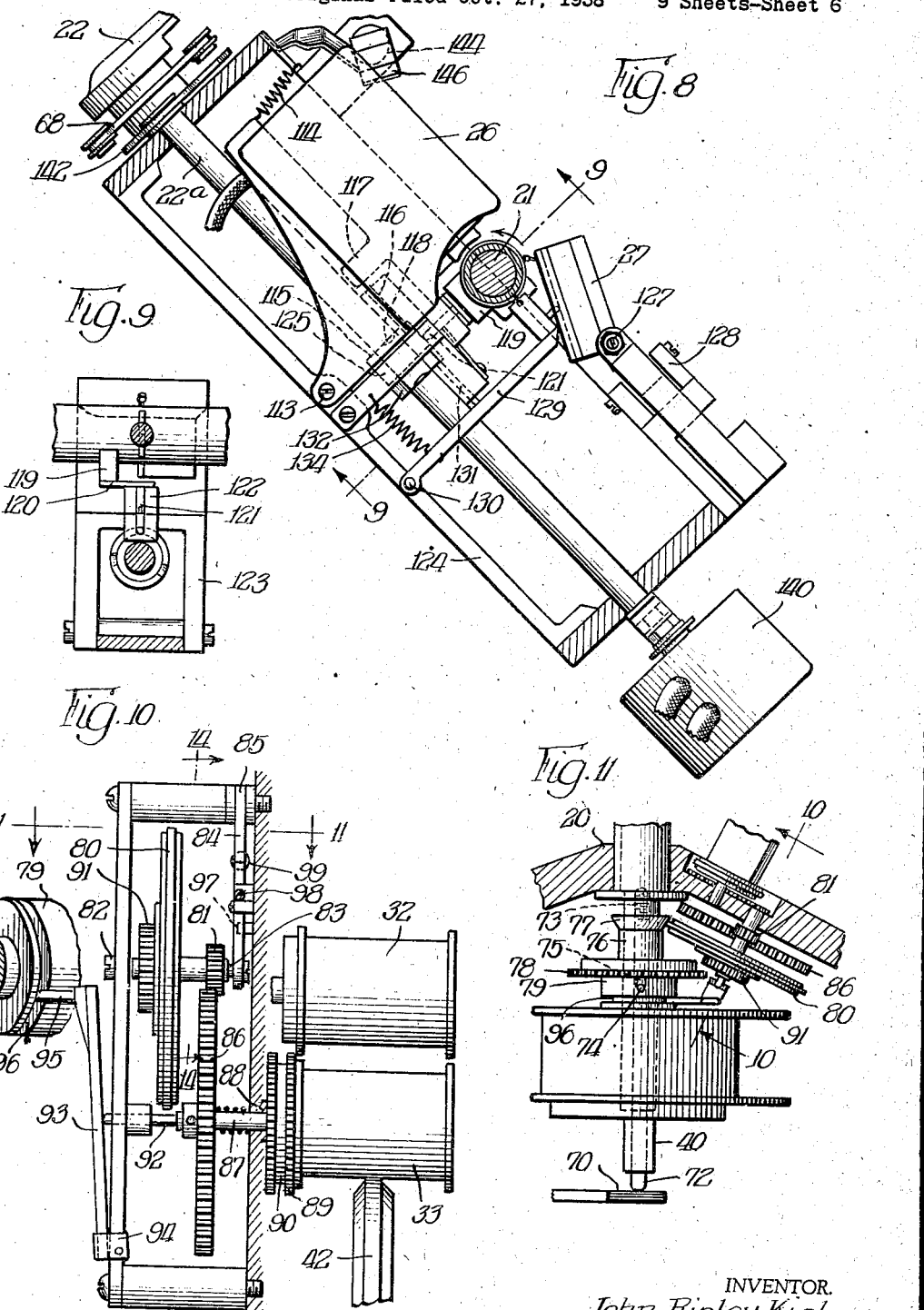

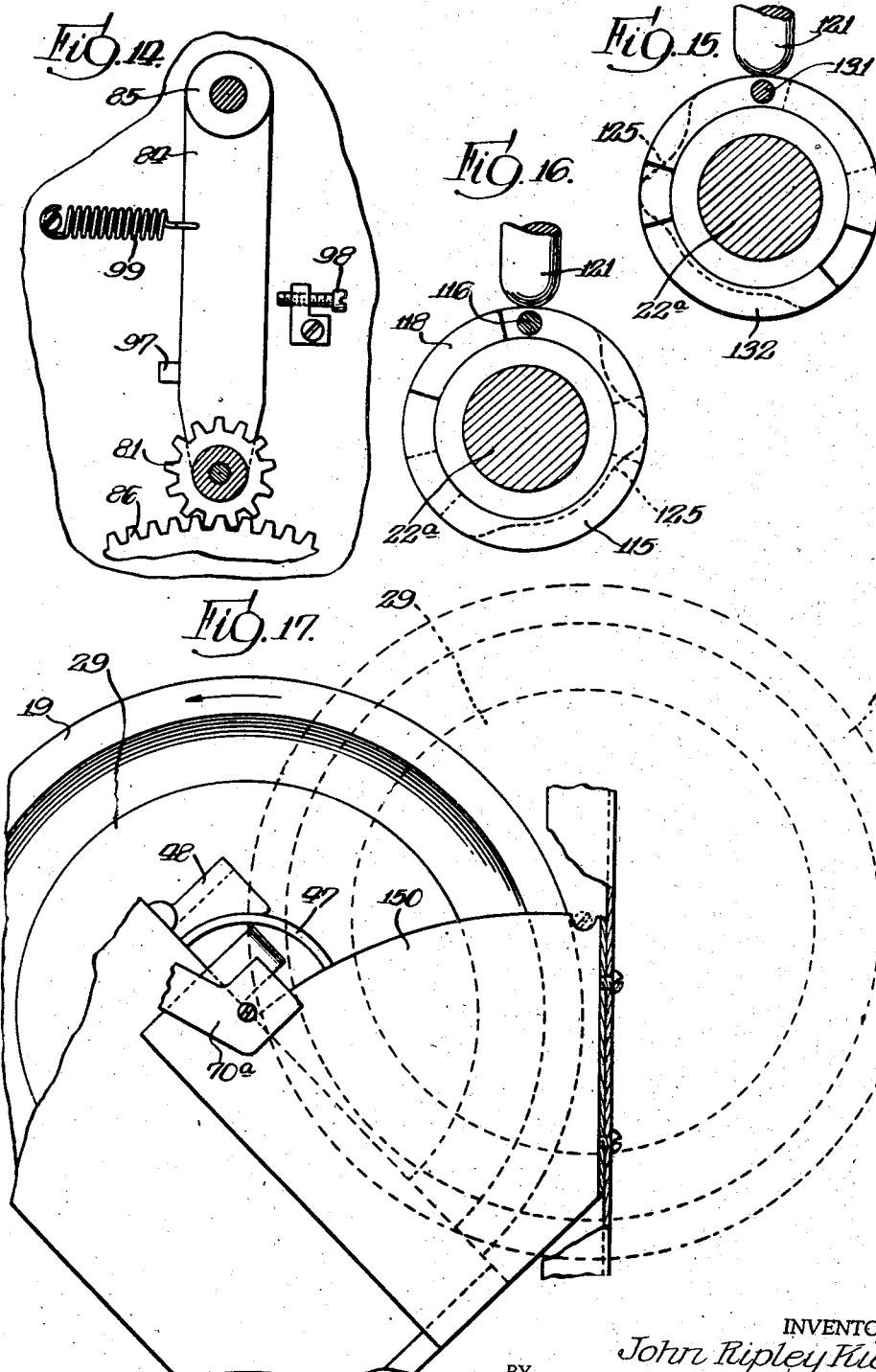

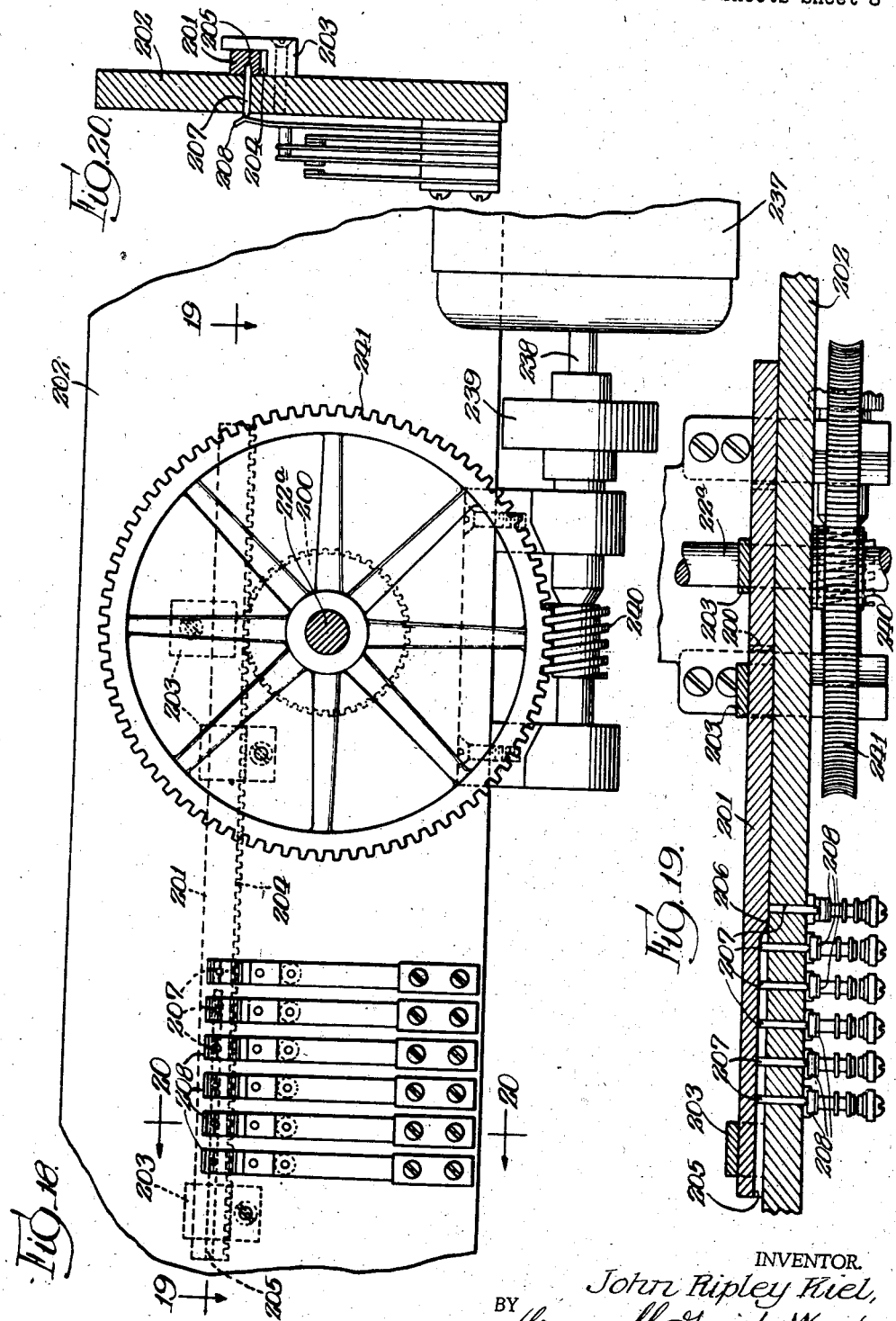

March 23, 1943.  J. R. KIEL  2,314,834
SOUND ON FILM
Original Filed Oct. 27, 1938   9 Sheets-Sheet 9
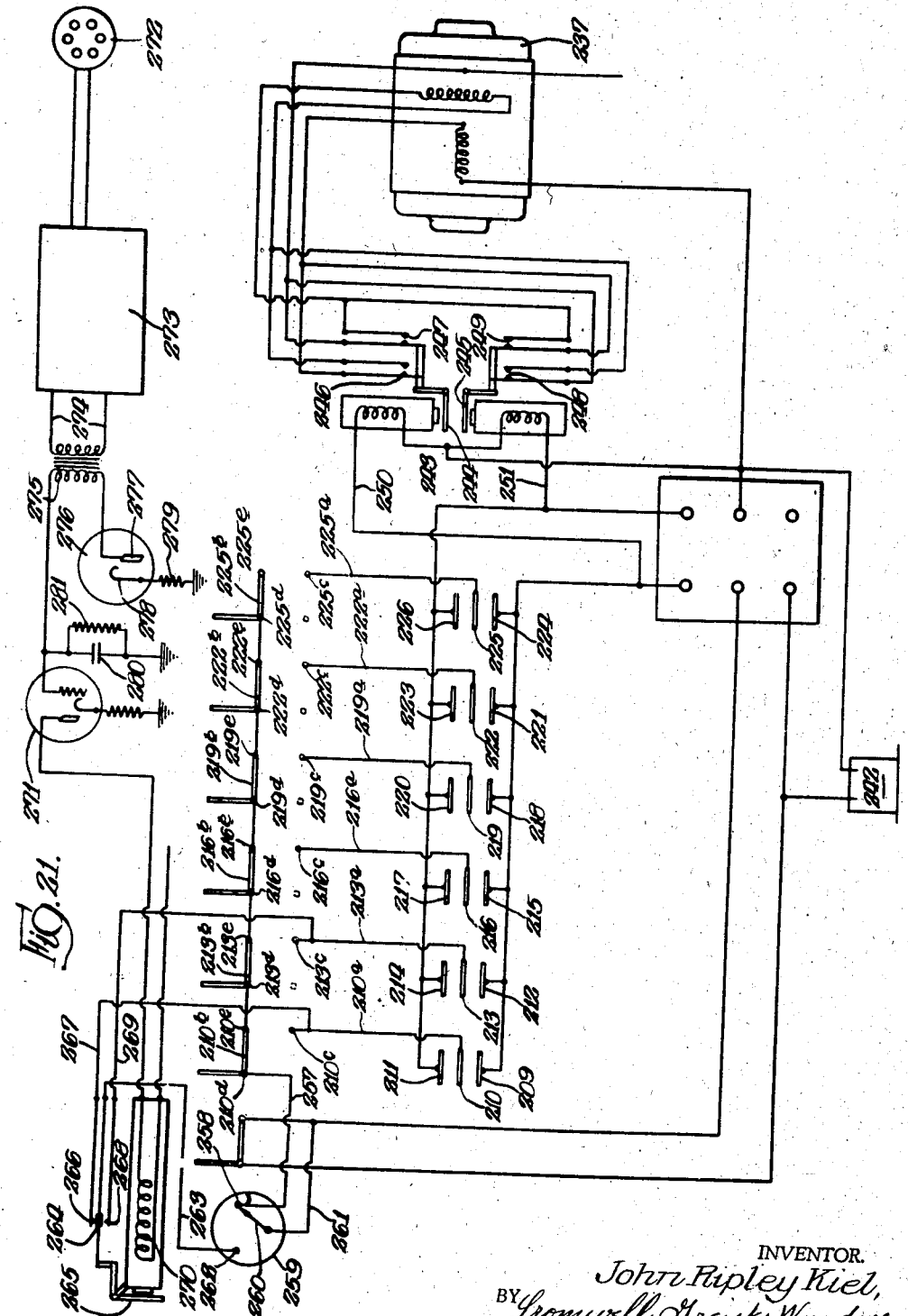
INVENTOR.
John Ripley Kiel,
BY Cromwell, Greist + Warden
ATTORNEYS.

Patented Mar. 23, 1943

2,314,834

UNITED STATES PATENT OFFICE 2,314,834

SOUND ON FILM

John Ripley Kiel, Merchantville, N. J., assignor to Mary R. Kiel, Wilmette, Ill.

Original application October 27, 1938, Serial No. 237,225. Divided and this application May 10, 1940, Serial No. 334,357

10 Claims. (Cl. 179—100.4)

This invention has to do with a method of recording and reproducing sound on film, apparatus for effecting such recording and reproducing, and the film record resulting from such method as practiced by such apparatus.

This application is a division of my co-pending application Serial No. 237,225, filed October 27, 1938.

It has been customary to produce by various forms of apparatus sound records extending longitudinally of sound carrier film strips and in some instances doubling back and forth in parallel relation. Such records are not only wasteful of the film material, not utilizing the same to the best advantage, but as a given portion of the record extends over a considerable longitudinal distance, it is very difficult, in reproduction, to re-locate a particular point of the record for "reading back," or for making a correction in the record as where the use is in a business dictating machine.

A feature of the present invention is the recording transversely rather than longitudinally of the sound carrier strip, and preferably diagonally in parallel lines extending at an angle of approximately 25° to 30° to the strip axis whereby the whole film surface is utilized, and the progress of the sound carrier film longitudinally beneath the stylus is but gradual, with the consequent result that widely separated portions of the record in point of time are not widely spaced in distance but closely adjacent, enabling the reversal of film movement to a desired record point for reading back to be accomplished quickly and with precision, assisted by indices of position also provided on the film according to my invention.

It has been proposed, as in Wildhaber Patent No. 1,707,243, to produce a record transversely of a film strip, and to a greater or less degree diagonally but in that case the recording is in part a duplication, the adjacent sound record lines being produced by a pair of styli in staggered or overlapped relation to compensate for the fact that each record is discontinuous at the film edge; whereas, according to my invention, the film is wound as a close helix upon a mandrel with the two edges in abutment, and there is but one stylus and one record line needed inasmuch as the recording is continuous from one edge of the film to the other abutting edge, bridging over from one to the other. As a consequence, while the Wildhaber invention does result in a decided economy of film material as compared with longitudinally extending records, yet according to the present invention there is an increased economy due to the fact that I use but one stylus, producing a single line record instead of a partial duplication. My invention solves the same difficulty with greater economy and added ease of locating a desired point in the record for reading back.

A further and quite important feature is the elimination of any click or other audible indication of the bridging or passing of the recording or reproducing stylus over the abutting edges of the film as helically wound upon the mandrel. In the construction of the Wildhaber patent this was avoided by discontinuing the recording by one stylus short of the edge and continuing the record with an overlap phase along an adjacent parallel line by the other stylus. According to my invention the sound groove made by a single stylus is continued entirely across from one edge of the film to the other, and any audible indication is avoided upon reproduction by cutting out the reproducing pick-up at the proper instant to omit the click. The interval of silence is so short that it cannot be detected.

I find it of advantage, also, as in the case of my former Patents Nos. 2,095,750 and 2,096,113 to mount the recording stylus substantially perpendicular to the carrier film surface rather than at an inclination thereto and to form the sound groove as a laterally undulating one rather than hill-and-dale, although the latter is entirely feasible.

Another feature of the invention is remote control which is of particular advantage where used in dictating and where employed for automatic recording of conversation or other sound without the intervention of an operator exercising manual control. This remote control may include manual actuation of media whereby the machine is set in operation to record, to reproduce or what not; also the actuation of such media by the voice or other sound whereby such sound will be recorded automatically without manual intervention.

Another feature of the invention is the co-operative interrelationship between various parts of the mechanism of the apparatus, gears, brakes, clutches, etc. whereby, without stopping or reversal of the motor drive, the direction of sound carrier film travel beneath the stylus may be reversed instantly, the speed of travel in reverse increased, stopped at a predetermined point and forward travel resumed, all controlled by the manipulation of a single manually actuated selective lever or the like.

In order to facilitate an understanding of the invention a preferred embodiment of apparatus is set out in the accompanying drawings; and the operation of the same, the characteristics of the record and method of its production are detailed in the following description; it being understood that the drawings and description are to be taken in an illustrative sense and not as limiting the invention as defined in the accompanying claims beyond that required by the state of the prior art.

Referring to the drawings,

Fig. 5 is a view of the end of the mandrel showing in dotted lines the spool of film and the threading of the film at one end of the mandrel;

Fig. 6 is a view showing in detail the gear arrangement on the take-up end of the mandrel taken on the line 6—6 of Fig. 7;

Fig. 7 is a sectional view showing the driving arrangement for the take-up end of the film;

Fig. 8 is a view showing the styli and a section of the mandrel at the point where the styli engage the film;

Fig. 9 is a sectional view on the line 9—9 of Fig. 8;

Fig. 10 is a view in elevation of the gearing at the feed end of the mandrel;

Fig. 11 is a sectional view taken on the line 11—11 of Fig. 10;

Fig. 14 is a sectional view taken on the line 14—14 of Fig. 10;

Figs. 15 and 16 are sectional views of the control cams mounted on the main control shaft of the machine;

Fig. 17 is a view showing the manner in which the mandrel is mounted in the machine;

Fig. 18 shows in detail the driving and switching mechanism for operation of the machine by remote control by the use of push buttons or in response to sound;

Fig. 19 is a sectional view taken on the line 19—19 of Fig. 18;

Fig. 20 is a sectional view taken on the line 20—20 of Fig. 18; and

Fig. 21 is a circuit diagram showing the circuit employed when the machine is arranged for remote control operation or operation as the result of sound.

Figure 1:
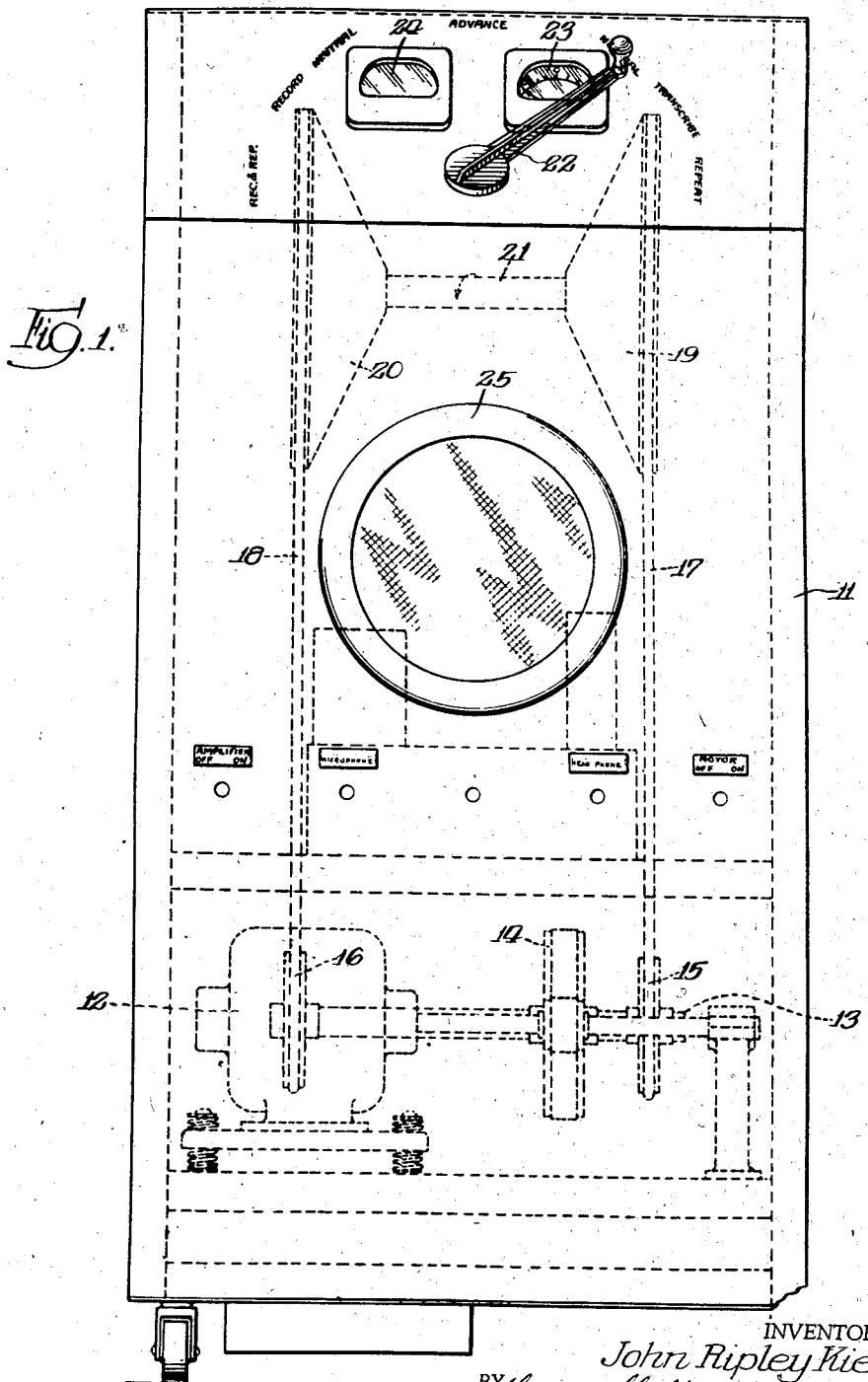
Fig. 1 is a view in elevation showing in dotted lines the general layout of the apparatus.

As indicated in Fig. 1 the device generally comprises a cabinet 11 in the base portion of which is mounted a motor 12 which drives a drive shaft 13 through means of the belt and pulley assembly indicated by the reference character 14. Mounted on the drive shaft 13 is a pair of pulleys 15 and 16 respectively which are connected through means of belts 17 and 18 to the cone-shaped heads 19 and 20 between which the mandrel 21 is positioned.

It will be apparent from the foregoing that operation of the motor will cause the mandrel 21 to revolve.

There is also shown in Fig. 1 the general arrangement of the cabinet, the control handle being indicated by the reference character 22, a recording meter by the reference character 23, and a viewing window 24. The loud speaker or reproducer is indicated by the reference character 25 and various positions of the control handle at points where microphones or head phones may be plugged in, and the motor switch are indicated by the legends on the drawing. The specific mechanism through which the control arm functions, the recording and reproducing mechanism, etc. is not shown in Fig. 1.

Arrangement of the film

Figure 2:
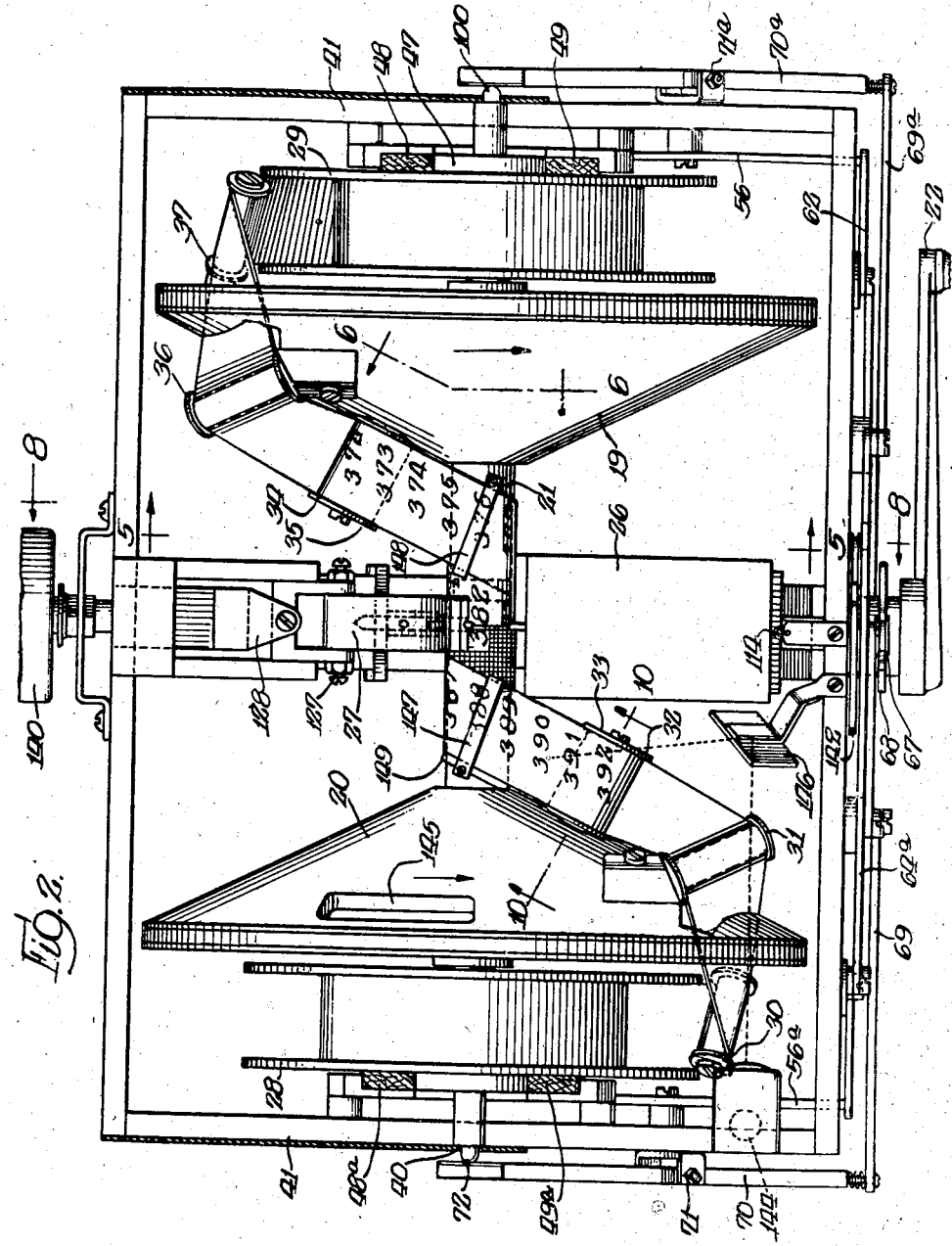
Fig. 2 is a detail view on a large scale of the mandrel upon which the carrier film is wound and revolved for recording and reproduction.
Figure 12:
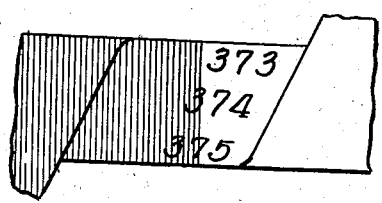
Fig. 12 shows a portion of the mandrel with the film wound thereon and the helical relationship of the film to the mandrel.
Figure 13:
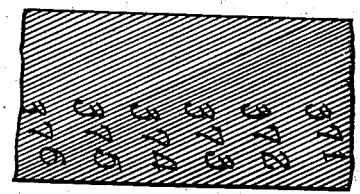
Fig. 13 is a view over a segment of film showing the numbering thereon and the diagonal position of the recorded grooves when the film is in a flat condition.

The mandrel 21 and its cone-shaped heads 19 and 20 together with the recording head 26 and the reproducing head 27 and their associated mechanisms are illustrated in Fig. 2. The mandrel and the cone-shaped heads 19 and 20 revolve in the one direction indicated by arrows. The feeding reel of film is indicated by the reference character 28 and the take-up reel is indicated by the reference character 29. From the feeding reel the film is fed over an idler guide roll 30, thence through a slot in the cone-shaped head 20 over an idler guide roll 31 and thence over the film feeding rollers 32 and 33 shown in detail in Fig. 10, and thence around the mandrel 21, the opposite edges of the film abutting as it passes about the mandrel in a helical relationship as shown in detail in Figs. 2 and 12. As the film leaves the mandrel 21 it passes over the take-up rollers 34 and 35, these two rollers being shown in detail in Fig. 5. After leaving the take-up rollers 34 and 35 the film passes over the idler guide rollers 36 and 37 through a slot 38 in the cone-shaped head as shown in Fig. 5. As is also shown in Fig. 5, the film passes on the take-up reel 29, being guided by the idler roller 39.

The feed reel 28 and the take-up reel 29 are journaled on the stationary shaft 40 as shown in Fig. 2. The shaft 40 is mounted in the frame 41 which frame supports the entire assembly and is in turn mounted in the cabinet 11.

On the shaft 40 is also journaled the mandrel 21 and its associated cone-shaped heads 19 and 20. The reels of film 28 and 29, being journaled on the shaft 40 have no direct connection with their respective cone-shaped heads 19 and 20, are driven solely by the strip of film. Each reel of film is provided with a braking mechanism, the details and the purpose of which will be hereinafter described.

The mechanism for imparting movement to the film

In the operation of the device the cone-shaped heads 19 and 20 are driven as shown in Fig. 1 through means of the belts 17 and 18. The mandrel 21 revolves with the heads and the strip of film wound upon the mandrel revolves the reels 28 and 29 respectively.

The progress of the film around the mandrel 21 when the device is being used for recording or reproducing is controlled by the rollers 32 and 33. As shown in Fig. 10 there is a pressure roller 42 mounted adjacent the feeding roller 33 to force the film into firm engagement with the roller 33 and to cause it to be tensioned against the periphery of that roller. Likewise the take-up rollers 34 and 35 are provided with a pressure roller 43 as shown in Fig. 5. Both the pressure roller 42 and the pressure roller 43 are mounted in the same manner, the detail of the mounting of roller 43 being shown in Fig. 5. This mounting consists of a curved arm 44 which is pivoted at 45 on the cone-shaped head and is provided with a spring 46 which is connected at one end to the head and at the other end to the arm 44 so as to cause the pressure roller 43 to firmly engage the film on the feed roller 35.

When in recording it is desired to advance the film to the take-up reel 29, braking action is applied to that reel so as to draw the film around the mandrel 21, the purpose of the rollers 32 and 33 being to feed the film onto the mandrel and to permit the take-up reel to draw the film around the mandrel. During the time that the film is being advanced for recording or reproduction the rollers 34 and 35 are idling.

It is obvious that the rollers 34 and 35 can be driven to aid the take-up reel 29 in feeding the film around the mandrel but in ordinary practice it is generally not necessary to drive these rollers when advancing the film.

When it is desired to reverse the direction of movement of the film the rollers 34 and 35 are driven and braking action is applied to the reel 28 which then draws the film around the mandrel 21 in reverse direction, the speed of the film being controlled by the speed of the rollers 34 and 35. These rollers perform the function of feeding the film to the mandrel.

In order to guide the film as it passes across the mandrel and to assure firm abutment of its edge portions the fingers 147 and 148 are provided as shown in Fig. 2. Associated with the finger 147 is an abutting edge member 149 which prevents the film from moving toward the take-up reel beyond this abutting edge and assures that it will always be centered.

Figure 4:
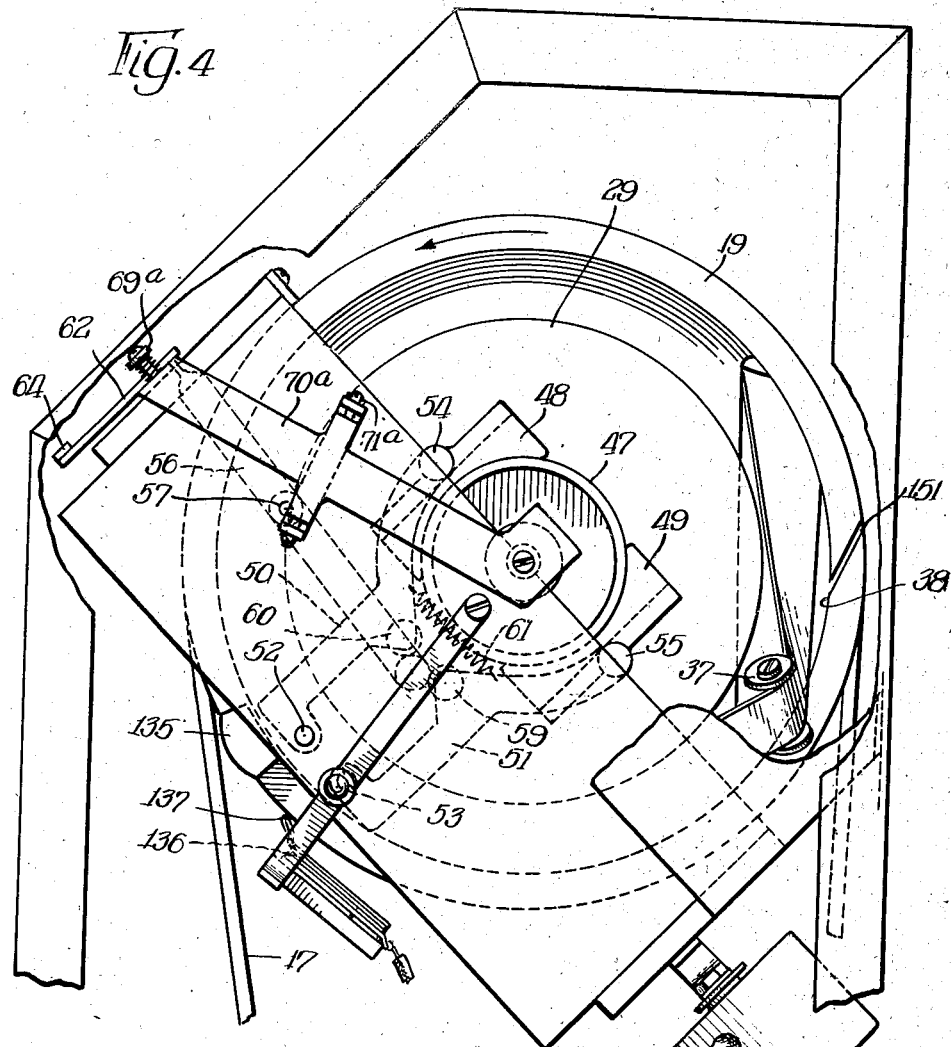
Fig. 4 is a sectional view through the top of the cabinet showing in particular the mechanism for breaking the circuit as the reproducing stylus of the machine passes over the abutting edges of the film.

The braking mechanism for the reel 29 and the reel 28 is of identical character and in Fig. 4 there is shown in detail the braking mechanism for the take-up reel 29. This mechanism comprises a cylindrical projection or drum 47 formed integrally with the reel, the periphery of which drum forms a braking surface which is engaged by the friction brake shoes 48 and 49 respectively as shown in detail in Fig. 4. The brake shoes are mounted on the arm members 50 and 51 respectively, which members are pivoted at 52 and 53. The other ends of the arm members are pivoted to the brake shoes 48 and 49 respectively as indicated at 54 and 55.

Operation of the brake shoes is accomplished by means of a lever 56 which is pivoted at 57 and provided at its inner end with a stud 58 which engages a pair of rollers 59 and 60, the rollers 59 and 60 being mounted on the arms 50 and 51 respectively. As is apparent from Fig. 4, actuation of the lever 56 causes the stud 58 to separate the brake shoes 48 and 49 as the stud moves between the rollers 59 and 60. The brake shoes 48 and 49 engage the braking surface of the cylindrical projection 47 through the action of a spring 61 which is connected to the brake arms 50 and 51 and tends to draw them together.

Figure 3:
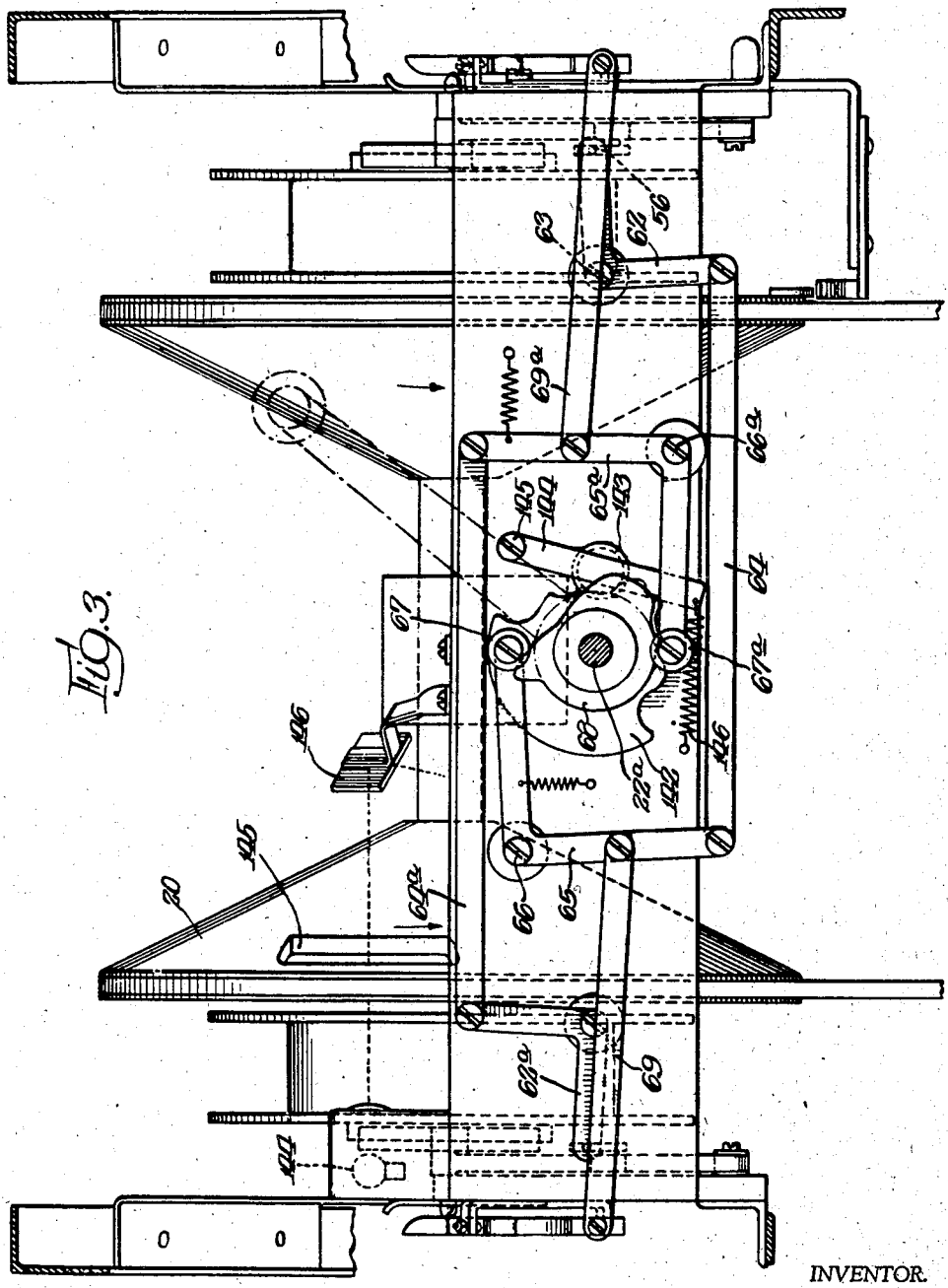
Fig. 3 is a view showing the cam and lever arrangement for adjusting the machine to its various positions for recording and reproduction purposes.

The braking arrangement for the reel 28 is identical with that of the reel 29 and in the drawings, particularly Fig. 3, the respective parts which control the braking mechanism for the reel 28 are indicated with the same numbers but with the addition of an exponent "a." Operation of the lever member 56 is governed by the control arm 22 shown in Fig. 1 through a series of levers shown in detail in Figs. 2 and 3.

Referring to Fig. 3, connected to the end of the braking lever 56 is a bell crank lever 62 fulcrumed at the point 63. Pivotally connected to the other arm of the bell crank lever 62 is a link 64 which connects with the bell crank lever 65, fulcrumed at 66. The other arm of the bell crank lever 55 is provided with a grooved roller 67 which rides upon the cam 68.

*The film feeding mechanism*

The operation of the rollers 32, 33 and the take-up rollers 34 and 35 is controlled from the bell crank levers 65 and 65a respectively through the links 69 and 69a. It will be obvious that upon rocking of the bell crank levers 65 and 65a that movement will be imparted to the links 69 and 69a. As shown in Fig. 2 the link 69 is connected to the arm 70 and the link 69a is connected to the arm 70a. The arms 70 and 70a rock around pivotal mounting points 71 and 71a respectively. The free end of the arm 70 engages the plunger 72 which plunger is slidably mounted in the bore of the shaft 40, as shown in detail in Fig. 11. Referring to Fig. 11 it will be seen that the plunger 72 is provided at its inner end with a spring 73 shown in dotted lines which abuts against it and tends to press it outwardly. Fixed to the plunger 72 is a pin 74 which projects through an elongated slot 75 in the shaft 40.

Slidably mounted on the shaft 40 and fixedly secured to the pin 74 is a sleeve member 76 which is provided at its inner end with a cone-shaped friction drive member 77 and near its medial portion with a gear 78 and at its outside end with a peripherally slotted boss 79. Adapted to engage the cone-shaped drive member 77 is a friction driven member 80 which has formed integral with it a pinion 81 as is shown in detail in Figs. 10 and 11. The friction-driven member 80 and the pinion 81 are mounted in needle-point bearings 82 and 83 respectively. The bearing 83 is in an arm member 84, adapted to swing about its pivot point 85. The purpose of providing the arm member 84 so that it may move about the pivot point 85 will be described in connection with the operation of the device.

Engaging the pinion 81 is a gear wheel 86 which is secured to the sleeve shaft 87, which sleeve is fixedly secured to the shaft 92. Also mounted on the shaft 87 is a pinion 88 which is adapted to engage the grooved gear 89. The gear 89 may consist of two gears in which the teeth are in register but are spaced apart or by a single gear which is provided with a groove as indicated at 90. The grooved gear 89 is fixedly secured to the feeding roller 33 so that rotation of the gear 89 imparts rotation to this feeding roller 33. As shown in Fig. 11 there is fixedly secured to the friction gear 80 a gear 91 which is adapted to mesh with the gear 78 when that gear is moved inwardly.

In order to disengage the gear mechanism thus far described from the feed roller 33 so that there will be no drag upon said roller during the time when it is desired to have said roller running free, the pinion 88 and gear 86 are fixed on the shaft 92, which shaft is slidably mounted to permit its endwise movement. Engaging the end of the shaft 92 is a lever arm 93 which is pivotally mounted at one end 94. The other end of said lever arm 93 is provided with a pin 95 which rides in the groove 96 of the boss 79 mounted on the sleeve 76. It will be apparent that movement of the plunger 72 to certain positions will actuate the lever arm 93 and cause the pinion 88 to be positioned opposite the groove 90 in the grooved gear 89. When so positioned the feed roller 33 is relieved from any driving action and also from any gear drag.

The purpose in relieving the feed roller 33 from gear drag is that when the film is reversed the speed of the film is quite rapid and due to the high ratio of the gears is would require excessive braking action on the reel 28 as well as high tension on the film between the reel and the rollers in order to cause reverse movement of the film.

Referring further to the operation of the gear mechanism shown in Figs. 10 and 11, it will be apparent that when the plunger 72 is forced outwardly under the action of the spring 73 and is relieved of pressure by the arm 70 the friction gears 77 and 80 will be in engagement and will drive the feeding roller 33 at a relatively low speed. That when the plunger 72 is depressed partially by the arm 70 the friction gears 77 and 80 will be separated and there will be no driving connection between these gears or between the toothed gear 78 and gear 91, and the pinion 88 will be positioned in the groove 90 of the grooved gear 89 so that there is no gear drag upon the feed roller 33. When the plunger is depressed to its extreme position the gear 78 and the gear 91 are engaged and the pinion 88 engages the inner tooth portion of the grooved gear 89. With this gearing relationship it will be obvious that the feed roller 33 will be driven at a high rate of speed.

*The means for compensation for lengthening of the film during recording*

As recording takes place the diagonal sound-grooving of the film strip lengthens it slightly with the result that if the film is fed at the same rate during reproduction as during recording, the reproducing stylus would tend to move axially along the mandrel. In order to compensate for this difference in length of the film the pivoted arm 84 is provided for the mounting of the friction gear 80. This arm is shown in detail in Figs. 10 and 14. As shown in Fig. 14 the extent to which the arm 84 may swing about its pivot is limited by the fixed stop 97 and by the set screw 98. The spring 99 yieldingly urges the arm 84 in the direction of the fixed stop 97. When the plunger 72 is in its released position, that is to say, when it is not being forced by the arm member 70 against the spring 73, the friction gear 77 is moved outwardly toward its utmost limit and the friction gear 80 tends to and does move toward the extreme diameter of the friction gear 77 with the result that as the friction gear approaches the extreme diameter the feed roller 33 is driven at a slightly increased rate of speed. The extent to which the friction gear 80 may move toward the extreme diameter of the friction gear 77 is controlled by the set screw 98 for it is obvious that the friction gear cannot move beyond the point at which the position of its axis will freely permit and the limit of movement of the axis is controlled through the set screw 98. Thus through adjustment of the set screw 98 it is possible to very accurately control the slight increase in speed of the film necessary in reproducing due to its very slight elongation in recording.

*The gear mechanism for driving the feed rollers 34 and 35*

The feed rollers 34 and 35 are controlled through the link 69a which is attached to the bell crank 65 as shown in Fig. 3 and, as appears from Fig. 2, the link 69a controls the arm 70a which is pivotally mounted at 71a and has a free end portion which engages the plunger 100. As shown in detail in Figs. 6 and 7, the plunger 100 is mounted similarly to the plunger 72 in the opposite end of the shaft 40 and is provided with a spring 101 which urges the plunger outwardly and with a pin 102 that passes through the elongated slot 103 in the shaft 40. The pin 102 is fixedly secured to the sleeve member 104, which sleeve is slidably mounted on the shaft 40. The sleeve 104 is provided at its inner end with a pinion 105 which is adapted to engage the large gear 106. Mounted on the same shaft as the gear 106 and fixedly secured thereto is a pinion 107 which drives the gear 108. Mounted coaxially with the gear 108 is a gear 109 which drives the gear 110. Gear 110 in turn drives gear 111. The gears 110 and 111 are secured to the feed rollers 34 and 35 respectively and drive the same.

It will be apparent that movement of the plunger 100 inwardly against the action of the spring 101 will disengage the pinion 105 from the gear 106 so that the feeding rollers 34 and 35 are not driven by the pinion 105.

*The control means for the movement of the film*

The cam 68 (Fig. 3) which controls the actions of the various links that actuate the pins 72 and 100 and the links which control the brakes is mounted on a shaft 22a which is rotated by the control arm 22. This cam is so shaped that when the control arm is located in the positions marked "Neutral", both sets of brakes 48 and 49 and 48a and 49a are disengaged, the arm 56 having forced the pin 58 between the rollers 59 and 60 as is more clearly shown in Fig. 4. The pin 100 is depressed so that the pinion 105 is disengaged from the gear 106 as is more clearly apparent from Fig. 7. The plunger 72 is depressed to the point that the friction gears 77 and 80 are just out of engagement, the gears 78 and 91 having not yet reached the point where they are engaged, and the pinion 88 is not out of engagement with the teeth in the gear 89, having not yet reached the grooved portion 90. It will be apparent that in the "Neutral" position the mandrel 21 and the cone-shaped members 19 and 20 will be revolving but no film will be moved relative thereto.

In the "Transcribe" position of the control arm 22 the cam 68 is so shaped that the associated levers cause the brake shoes 48 and 49 to engage the brake band on the reel 29 and thus tend to hold this reel from rotation and to tension the film to cause it to feed from the left to the right on the mandrel. The brake comprising the shoes 48a and 49a on the reel 28 is completely released or it may exert but a slight effect on the reel 28 to prevent overrun in case of sudden stoppage. The plunger 100 shown in Fig. 7 is in the same position as in the "Neutral" position, that is to say, the gears 105 and 106 are disengaged. The plunger 72 shown in Fig. 11 is extended to its utmost limit, the arm 70 having moved entirely away from it, the friction gears 77 and 80 being in engagement, and the gear 80 riding on the greatest diameter of the friction gear 77 so, as has been heretofore pointed out, to slightly increase the speed of rotation of the gear over its speed when used in recording position.

When the control lever 22 is moved to "Repeat" position, the cam 68 is so shaped that the brakes 48 and 49 are released and the brakes 48a and 49a are in engagement with the brake band on the reel 28 so as to tension the film and cause it to move from right to left across the mandrel 21 as shown in Fig. 2. The plunger 72 is now depressed to the point that the friction gears 77 and 80 have become disengaged, the gears 78 and 91 have not yet become engaged and the pinion 88 has moved into the slot 90. The plunger shown in Fig. 7 and numbered 100 is now moved to its outward extremity under the action of spring 101 so that the gears 105 and 106 have become engaged to feed the film through the rollers 34 and 35 to the mandrel.

When the control arm is moved to the position marked "Advance" the brakes 48 and 49 have engaged the brake drum 47 on the reel 29 and the brakes 48a and 49a are completely released. The plunger 72 as shown in Fig. 11 has been depressed to the point that the gears 78 and 91 are in engagement, the friction gears 77 and 80 are out of engagement and the pinion 88 has moved beyond the slot 90 and into the teeth of the gear 89. The plunger 100 shown in Fig. 7 is now depressed by the arm 70a so that the gears 105 and 106 are out of engagement. Due to the high ratio of the gearing on the feeding side as shown in Fig. 11 the film advances at a rapid rate of speed.

When the control lever is in the "Record" position the brakes 48a and 49a are released and the brakes 48 and 49 are in firm engagement with the brake drum attached to the take-up reel 29. The plunger 100 shown in Fig. 7 is depressed to the point that the gears 105 and 106 are out of mesh. The plunger 72 shown in Fig. 11 is depressed to the point that the friction gears 77 and 80 are in engagement, the gears engaging at the smallest diameter of the gear 77. The gears 78 and 91, are, of course, out of engagement and the pinion 88 is in engagement with the gear 89.

When the arm is in the position indicated by "Record and reproduce" (Fig. 1), the arrangement of the brakes and gearing is the same as in the "Record" position.

*The control for positioning the reproducing head*

As shown in Fig. 8 the recording head 26 is pivotally mounted at 113, the point of mounting being preferably positioned on a line tangent to the mandrel at the point of recording.

The pressure which the recording head exerts upon the film may be conveniently controlled through an adjustable spring 114. The position of the recording head with respect to the film is determined by means of a cam 115 which is fixedly mounted on the control shaft 22a. The cam 115 has abutting against it the end of a pin 116 which pin is slidable axially in its mounting, the other end of the pin 116 engaging a projection 117 on the recording head as shown in dotted lines. When the control arm 22 is in "Neutral," "Advance," "Transcribe" or "Repeat" positions the cam 115 is so shaped that the pin rides on its outer periphery and raises the recording head from engagement with the film. When the control arm 22 is in "Record" and in "Record and reproduce" positions, the pin 116 is dropped into one of the depressions 118 of the cam so that the recording head is dropped down into engagement with the film. A detailed view of this cam is shown in Fig. 16.

In order to aid in the advancement of the film during recording and reproduction and to cause the film to tend to move along the mandrel toward the take-up reel and keep the edges of the film in firm abutment as they helically pass about the mandrel, a friction shoe 119 is advantageously provided as shown in Fig. 8, this friction shoe having a face which extends partially about the film as it is wound upon the mandrel. The friction shoe 119 is faced with leather or some other non-abrading friction material. The shoe is mounted on a short leaf spring 120 as shown in detail in Fig. 9, the spring having the proper resiliency to exert a slight pressure upon the shoe and direct it into engagement with the film. The other end of the spring 120 is fixedly secured to a plunger 121, which plunger is slidably mounted in the projection 122 integral with the yoke member 123. The yoke 123 is fixedly secured to the frame assembly 124.

The plunger 121 engages the face of the cam 125. The cam 125 which is shown in detail in Figs. 15 and 16 is so shaped that when the control arm 22 which rotates the shaft 22a upon which the cam 125 is mounted, is in "Record" or "Transcribe" positions the shoe 119 is advanced under tension of the spring 120 to engage the film. When the control shaft 22a is in any other position the plunger reseats into a depression in the cam so that the friction shoe 119 is out of engagement with the film.

It is desirable to have the friction shoe in engagement with the film in the positions shown for the reasons above specified. However, when the control arm is in "Advance" or "Repeat" positions the film is moving at such high rate of speed across the mandrel that it is undesirable to have any friction applied to it by the friction shoe 119.

*The control for the reproducer*

As shown in Fig. 8 the reproducer 27 is mounted by means of universal pivots indicated at 127 and 128. An arm member 129 which is pivotally mounted at 130 to the sub-frame 124 engages the bottom side of the reproducer. Abutting the arm 129 is a plunger 131 which engages the cam face 132. Urging the arm 129 into engagement with the plunger 131 and the latter into engagement with the cam face 132 is a spring 134 which is secured to the arm 129 and to the sub-frame. The reproducer 27 is so positioned that it tends under the action of gravity to engage the film, and the cam face 132 is so shaped that when the control lever 22 is actuated the cam will be so rotated that the reproducer will engage the film when the cam lever is in the recording and reproducing and in the transcribing positions. At other positions of the control lever the cam urges the plunger 131 against the arm 129 to cause the latter to swing about its pivot 130 and raise the reproducer 27 from the film. The details of the cam 132 are shown in Fig. 15.

*The reproducing and recording circuits*

The reproducer and the recording head are connected to the usual amplifier circuits to permit of recording and reproduction, standard microphones and loud speakers being used in these operations. Such circuits do not constitute an essential part of my invention and since they are well known and understood by those skilled in the art they are not shown in the drawings or described in detail for to do so would merely make the drawings more complicated and lengthen the description.

Control of the circuits to the reproducing head and the recording head are through means of the switch, the housing of which is indicated by the reference character 140 in Fig. 8. Only the housing of the switch is shown because it is a standard multiple contact switch, the contacts being stationary and there being a series of control arms which are mounted on an extension of the control shaft 22a and revolve with it. The contacts and control arms are so arranged and connected that when the cutting head is in engagement with the film the microphone is connected through the amplifier to the recording head. Likewise when the control shaft 22a is positioned so that the reproducer is in engagement with the film the amplifier is connected to the loud speaker and when the film is in repeat or neutral positions the amplifier may be cut out of the circuit.

*The general plan of the control mechanism*

It will be apparent from the foregoing description that mounted on the control shaft 22a are all of the control cams and mechanisms, namely, the cam 68 which controls the engagement and release of the brakes on the reels of the film and also action of the film feed rolls. Thus, through this cam the direction and rate of movement of the film for the various operations is controlled. Through the cam members 115, 125 and 132 the position of the reproducer and the recording head, together with the film-engaging member 119, are positively controlled and these controls, being on the same shaft and being correlated to the cam 68 insure proper setting of the mechanism for each of its several operations.

The switching mechanism 140 being likewise mounted on the control shaft 22a and coordinated with the cam members connects the proper electrical circuits to the amplifier and the loud speaker. Thus the entire control of the machine is accomplished through a single shaft and a single control lever.

In order to insure proper positioning of the control shaft 22a upon the manipulation of the control arm 22 or the electrical means of control hereinafter to be described, the cam 142, shown in Fig. 3, is provided on the control shaft 22a. This cam is provided with openings to receive a roller 143 which roller is mounted on the lever 144. The lever 144 is pivoted at the point 145 and provided at its opposite end with a spring 146 the spring urging the lever 144 and the roller 143 toward the cam surfaces of the member 142. Thus, as the control shaft 22a is moved to various positions, which positions are represented on the cam 142a by a hollow portion, the roller 143 drops into the hollow portions and thus holds the control shaft 22a in the desired position.

*The means for eliminating noise as the reproducing head passes over the abutting edges of the film*

It will be apparent that as the reproducing stylus passes or bridges over the abutting edges of the film as the mandrel 21 revolves there would be produced a click or undesirable noise unless some means is provided for eliminating this noise during reproduction. This is accomplished in the specific form of the invention shown by the provision of a projection 135 which may be positioned on either one of the cone-shaped members 19 or 20. This projection is shown in detail in Fig. 4. This projection is positioned on a radial line at the point of contacting of the reproducing stylus with the joint between the edges of the film and as they pass the stylus. The projection 135 actuates a switch 136 by means of a wiper 137, which switch 136 is so connected in the amplifier circuit as to cause that circuit to go dead at the instant the reproducing stylus passes the joint in the film.

It is obvious that there are a number of ways of causing the amplifier to cease to function at this instant such, for instance, as the application of a blocking voltage to the control grid through the closing of the switch 136 or by short-circuiting the pick-up, etc. In lieu of mechanical means for actuating the switch 136, a magnet may be so positioned as to actuate an armature from the switch when the magnet passes the switch. Such a system would have the advantage that it would eliminate any mechanical noise resulting from contact of the wiper 137 with the cam member 135. Obviously any method may be employed which will have the effect of blocking out the reproducer at the instant that it bridges the edges of the film.

*Means for determining the position of the film in the machine*

In order that the operator may determine the position of the film in the machine the film is provided with a series of numbers which are imposed on it diagonally so that when the film is wound on the mandrel they are in line with the axis of the mandrel.

As shown in Fig. 3, a source of light is provided at the point 144 which light passes through a slot 145 in the head 20. This light is reflected by the mirror 146 onto the film. It will be apparent that as the head revolves the light will only strike the mirror and the film once in every revolution and it will always strike the film at the same point. Thus, by viewing the film through the opening 24 of the casing, shown in Fig. 1, upon each revolution of the mandrel the number then in position will become visible for an instant. Since the light only strikes the film for an instant at a time the number will appear to be nearly stationary although, in fact, it is revolving at the same rate of speed as the mandrel. This feature is of importance because if the light were not flashed at intervals but allowed to play directly on the film at all times the film is moving at such rate of speed during the rotation of the mandrel that it will be difficult, if not impossible to read the numbers.

*Method of threading film*

As shown in Fig. 17 the mandrel and the heads 19 and 20, together with their supporting shaft 40, are mounted in the machine by sliding them on the curved portion 150 of the frame assembly. As shown in dotted lines, the mandrel and the heads can be readily removed from the interior of the machine to a point of easy access merely by sliding them to the position shown in dotted lines in Fig. 17. In this position either the take-up or the feeding reel of film may be removed or replaced. When inserting the new film the reel holding it is placed upon the shaft 40 as in the position 28 in Fig. 2. The film is then fed over an idler guide roller 30 thence through a slot in the cone-shaped head 20 over an idler guide roller 31 and thence over the film feeding rollers 32 and 33 and thence around the mandrel 21 to the feed rollers 34 and 35 on head 19 around the guide rollers 36 through the slot 151 shown in Figs. 4 and 5 into the opening 38 in that head 19. Thence the film passes over the guide rollers 37 and 39 and onto the reel 29.

The mandrel and head assembly is then positioned in the machine and is ready to operate.

The mechanism as it has thus far been described is to be controlled manually, that is to say, through means of the control arm 22 which for ordinary purposes will be entirely satisfactory. However, there are many cases in which it is desirable to have the machine start to transcribe when sound occurs and to cease transcribing when there is no sound or to be able to control the machine at a distance by means of push buttons or other similar mechanism.

Remote and automatic control

As shown in Figs. 18 to 21 inclusive remote and automatic voice control of the recording machine is accomplished by providing on shaft 22a a pinion 200 which operates a rack 201. As shown in the drawings the rack 201 is slidably mounted on a supporting plate 202 by means of the members 203. The rack member 201 is provided with teeth 204 which engage the pinion 200. The face of the rack engaging the supporting plate is provided with a groove 205 which has an elevated portion 206 therein so that the grooved portion of the rack acts as a cam-shaped surface. Engaging the cam-shaped surface are a plurality of fingers 207 which pass through the supporting plate 202 and which are held in engagement with the cam-shaped surface of the rack by a plurality of springs 208, here shown as six in number, which springs are mounted on the under side of the supporting plate. Mounted adjacent each spring 208 are three contact members each of which is insulated from the springs and from each other. These contact members bear numbers 208 to 226 inclusive.

As shown in the circuit diagram, Fig. 21, these contact members are electrically connected through appropriate switching mechanism and relays hereafter described to the motor 237. The motor 237 is provided with a shaft 238 and through a magnetic clutch 239 actuates a worm gear 240. The worm 240 operates a worm wheel 241 which is fixedly secured to the shaft 22a.

A magnetic clutch 239 is electrically connected to the motor circuit so that when the motor circuit is energized the clutch engages and at the moment that current ceases to flow to the motor the clutch disengages. Thus the momentum of the motor which might cause the device to overrun or hunt were it not for the clutch is effectively removed from the apparatus due to the instantaneous release of the clutch when the circuit to the motor is opened. The electrical connections are not shown between the motor and the clutch as they are of an obvious character and illustration of them would merely encumber the drawings. Furthermore, the clutch need not necessarily be of the magnetic type but may be a plain friction clutch which is engaged or disengaged through axial movement of the motor shaft caused by mounting that shaft so that the armature is out of line with the field and is pulled into line upon energizing the motor.

From the foregoing it will be apparent that when the motor is energized the shaft 22a will be rotated through the worm wheel 241 and the worm gear 240 and at the same time the pinion 200 will rotate to move the rack 201 lengthwise, the direction of movement of the rack depending upon the direction of rotation of the motor 237.

In order to position the control shaft 22a and thus effect remote control of the machine as heretofore described the following circuit arrangement is employed. As shown in the circuit diagram, Fig. 21, the course of current is indicated at 242 which may be an ordinary light socket. From this source one side of the line leads to the mid-point of a two coil relay 243. The relay 243 is provided with appropriate armatures 244 and 245 to each of which actuates two pairs of contacts, these pairs of contacts being indicated by the reference characters 246, 247, 248 and 249 respectively. From these pairs of contacts are lead wires as indicated in the drawings to the brushes and field of the motor so that the motor will operate in one direction when the armature 244 is actuated by its associated coil of the relay and the motor will run in the opposite direction when the armature 245 is actuated by the associated coil of the relay. The details of the connections between the motor and the relay are not described because they are merely standard practice in the reversing of motors.

The alternative energization of the respective coils of the relay is accomplished through leads 250 and 251. The lead wire 250 is connected with the contacts 209, 212, 215, 218, 221 and 224 and the lead wire 251 is connected to the contact members 211, 214, 217, 220, 223 and 226. The center contacts 210, 213, 216, 219, 222 and 225 are attached to leads bearing the suffix a which leads are each connected to a series of push button switches designated by the suffix b. These switches are all alike. The switches are provided with three contact members which are adapted to engage the circuit making and breaking member when the switch is in various positions. For example, in the switch 210b the contact member 210d wipes the making and breaking member and the contact member 210e disengages the making and breaking member when the latter is pushed downwardly to engage the contact member 210c. Such switches are commonly employed for various purposes and are well known. In effect these switches are sliding single pole double throw switches.

The lead wire 210a is connected to the contact 210c of the switch 210b. Likewise the lead wire 213a is connected to the contact 213c and the other lead wires bearing the suffix a are connected to the contact points c of their corresponding switch.

The wiping contacts of the switches are indicated in the drawings by the suffix d. The contact member which connects the switches in series when the buttons are in raised position is indicated by the suffix e. From the wiping contact 210d a line 257 goes to the contact 258 of the single pole double throw switch 259. The control member 260 of the switch 259 is connected to the lead wire 261 which returns to the source of energy such as the light socket.

From the part of the apparatus and circuit thus far described it will be apparent that, when the switch 259 is set so that the control arm engages the contact 258, upon depression of any one of the push button switches the circuit will be completed to the motor and it will operate to move the control shaft 22a into the desired position. For instance, should it be desired to position the control shaft 22a so that the machine is in neutral position, the push button switch having the contacts 210a, 210b, 210c and 210d will be depressed. Upon depressing this switch the flow of current to the other push button switches will be broken between the contacts 210d and 210e and the circuit will be closed between the contacts 210d and the contacts 210c. It will then pass through the line 210a to the center contact 210. If the center contact 210 is in engagement with the contact 209, and its engagement with contact 209 or 211 will obviously depend upon the position of the rack 201, then the current will pass through the line 250 to energize the coil operating the armature 244 to cause the motor to rotate in the direction to move the rack so that the raised portion of the cam surface in the groove 205 will engage the finger 207 which controls the position of the contact 210. When the finger 207 has ridden up part way on the raised portion of the cam surface contact 210 will be disengaged from the contact 209 and energy to the motor will be cut off and due to the magnetic clutch arrangement hereinafter described the control shaft 22a will instantly cease movement and the machine will be in the neutral position.

On the other hand, if the control shaft 22a is so positioned that the finger 207 actuating the contact 210 is riding upon the high portion 206 of the cam surface 205 of the rack 201, then the contact 210 will be in engagement with the contact 211 which will close the circuit through the line 251 to the relay and energize the coil which actuates the armature 245 and causes the motor to rotate in the opposite direction. Obviously as soon as the finger 207 then reaches a point on the cam surface 205 so that the contact 210 is out of engagement with the contact 211, the motor circuit is disconected and the control shaft 22a will cease movement and the machine will be in neutral position.

Thus it makes no difference in what position the control shaft is. Upon manually depressing the proper button the control shaft will be moved and stopped at the desired position.

The fingers 207 and their associated contacts are so connected to the various push buttons that when the push button 210b is depressed the apparatus will be in neutral position. That is to say, the shaft 22a will rotate to the position that the recording and reproducing mechanism is in neutral. When the push button 213b is depressed the control shaft 22a is revolved so that the apparatus is in recording position and when the push button 216b is depressed the control shaft 22a is revolved so that the apparatus is in advance position. When the button 222b is depressed the control shaft is revolved so that the apparatus is in transcribe position. When the button 225b is depressed the apparatus is in neutral position.

The series of push buttons are so interconnected by well known mechanism that upon pushing down one button any other button that has been depressed will automatically rise. Thus it is only possible to have one button in depressed position at a time.

In order to operate the machine automatically, that is to say, so that it will be responsive to the voice or sound, the arm member 260 of the switch 259 is positioned to engage the contact 262, in which position the line 261 is connected to the connecting wire 263, which wire is connected to the contact 264. The contact 264 is pivotally mounted so as to be actuated by the armature 265. Normally the contact 264 engages the contact member 268 due to spring pressure which is applied to the contact 264 through any one of well known arrangements.

The contact 266 is directly connected to the contact member 210c through a lead 267. Also adapted to engage the contact 264 under the action of the armature 265 is the contact 268 which through the lead wire 269 is connected to the contact member 213c.

It will be apparent that when the contact member 264 engages the contact member 266 current flows from the lead line 261 through the switch 259 and the lead wire 263, thence through the contact members through the lead wire 267 to the contact 210c which connections have the same effect as depressing the button 210b and when so connected the motor will operate to bring the machine to neutral position as heretofore described. Likewise when the armature 265 is released the contact 264 engages the contact 268 and current will be fed through the lead line 269 to the contact 213c which will have the same effect as depressing the button containing this contact. Whereupon as has heretofore been described the energy passing through this circuit will cause the motor to position the control shaft 22a so that the machine is in the recording position.

The armature 265 is actuated through the relay coil 270 which coil is energized from the control tube 271 which may be a standard three-element vacuum tube or three elements of a tube having a dual function. One side of the coil 270 is connected to the B plus side of the tube circuit and the other side to the plate circuit so that when the grid of the control tube 271 is made negative with respect to the cathode the coil 270 is de-energized and the armature 265 is released.

In order to provide a negative bias on the grid of the tube 271 in response to sound a standard microphone indicated by the reference character 272 is connected through an amplifier circuit indicated by the reference character 273 to the input 274 of a step-up transformer. From the secondary 275 of the step-up transformer the current is passed through a rectifier circuit which includes a rectifier tube 276 having an anode 277 and a cathode 278. The cathode is connected to the ground through a resistance of high value 279 so that the output of the tube is impressed upon the control grid of the tube 271. In order to delay the action of the control grid 271 in the event the sound applied to the amplifier is momentarily discontinued a condenser 280 is provided in the control grid circuit. In order that the condenser will discharge at a slow rate a bleeder resistance of high value 281 is connected across the condenser 280.

It will be apparent that from the foregoing description when it is desired to have the machine operate by the push button control the switch 259 has its control arm 260 so positioned as to engage the contact 258 whereupon, by depressing the appropriate button, the machine will assume the desired position.

It is generally desirable that the push buttons be mounted in a separate control box and that a multiple wire cable run from the push buttons to the machine. Thus the machine may be set in a corner of the room and operated from a distance. On the other hand, when it is desired to have the machine record and act in response to sound the control arm 260 of the switch 259 is moved to engage the contact 262. In this position the machine will record any sound which reaches the microphone and film will only be consumed during the time that sound is impressed upon the microphone. The advantage of its arrangement is obvious under many conditions. For instance, it may be desirable to have the machine record all transmission or all reception from an airplane transmitter. Since these transmitters only operate periodically no film will be consumed during the intervals of silence, or, if the machine is to be used as an ordinary dictating machine when the dictator ceases dictation the machine automatically discontinues the use of film. On the other hand, when the dictator starts again to dictate the machine begins to function.

It is to be observed that the relay, including the contacts 264, 266, 268 and the armature 265, is so arranged that should anything happen to the control tube 271 or its associated electrical elements the contacts 264 and 268 will remain in engagement and the machine will be in recording position although it will not stop on the cessation of sound. Thus, if the machine is to be used in some place where it is essential that it record all sound, failure of the electrical control mechanism will not cause the machine to cease operation but it will continue to operate at all times.

Summary

Most of the advantages of the machine described will be apparent to those skilled in the art upon understanding the construction and operation thereof. A feature of particular importance, however, is that the machine is operated by a single control shaft with the result that control is readily accomplished by an inexperienced person who has no knowledge whatsoever of mechanics or the electrical arrangements of the machine. Thus, if the machine is operated manually through use of the lever 22a the mere positioning of that lever at the points indicated on the casing of the machine will cause it to function in the proper manner. On the other hand, due to the use of but a single control shaft remote control of the machine by various means, including those just described, may be conveniently accomplished with a minimum of mechanism. Furthermore, such mechanism can be so simply arranged as to make the use of the machine with such control mechanism or sound-responsive means possible by one who has no electrical or mechanical knowledge.

Another feature of importance is that since the film is recorded diagonally it is possible to record on a very short strip of film a substantial amount of material and since the recording is continuous and compact, 15 feet or less of 35 mm. film is sufficient to record an hour's dictation or other matter. This feature is of importance because in recording such matter as radio broadcasts and the like for the purpose of keeping a permanent record, the amount of space required for such film record is reduced to a minimum as is the cost of film necessary to make such a record.

Another feature of importance is that each component part of the machine is relatively simple and with few exceptions need not be extremely accurate in its arrangement or dimensions. Thus, the allowable tolerances for manufacture are relatively great.

It has been found that the machine is extremely accurate in reproduction and recording, that there is little or no wear of the parts and, therefore, it has long life and servicing requirements are reduced to a minimum.

I claim:

1. The method of reproducing a sound record from spaced parallel sound grooves extending obliquely across a flexible carrier strip which consists in curving the carrier strip into helical form with opposite edges closely adjacent to register spaced sound grooves for continuity, progressing said carrier longitudinally and transversely in respect to a fixed sound reproducer, moving along the grooves across the carrier edges and silencing the reproducer at the instant of passage over the adjacent edges of the carrier.

2. The method of reproducing a sound record in sound grooves extending in spaced relation obliquely across the surface portions of a flexible carrier, which consists in supporting and moving the carrier in helical relation past a reproducing medium moving across adjacent edges of the carrier along the recording, and silencing the reproducing medium during the instant of its passage across the edges of the carrier.

3. The method of reproducing a sound record in spaced recordings extending across a flexible carrier which consists in supporting the carrier with edges thereof closely adjacent with opposite ends of recordings thereon in substantial registry, causing a sound reproducing medium to move over the recordings and across the adjacent edges of the carrier and disabling the sound reproducing medium during the instant of its passage from one recording to another.

4. The method of reproducing a sound record from spaced parallel sound grooves extending obliquely across from one edge to the other of a flexible carrier strip, which consists in supporting and moving said carrier in helical relation with edges of the carrier closely adjacent and with sound grooves thereon in substantial registry, contacting the carrier with a reproducing stylus of a sound reproducer moving across the edges of the carrier from one sound groove to another, and in silencing the reproducer during the time interval of passage of the stylus across the adjacent edges of the carrier.

5. The method of reproducing sound from an elongated flexible record strip having sound tracks thereon in substantially parallel lines extending from edge to edge of the strip, which consists in supporting and positively feeding said strip with opposite edges thereof closely adjacent and with continuing sound tracks in registry at the adjacent edges following the sound tracks on said strip as the strip is fed with a sound pick-up unit, and amplifying the sound picked up by the unit, the feeding of the strip to the pick-up unit being such that the pick-up unit traverses the abutting edges of the strip.

6. The method of reproducing sound from an elongated flexible record strip having sound tracks thereon in substantially parallel lines extending from edge to edge of the strip, which consists in supporting and positively moving said strip with opposite edges thereof closely adjacent and with continuing sound tracks in registry at the adjacent edges, taking sound from successive sound tracks in continuity across the abutting edges of the strip with a suitable sound reproducer, amplifying the sound from the reproducer for audibility and eliminating therefrom any audible indication of the passage of the sound reproducer from one sound track to another by silencing the audible reproduction at the instant of passage.

7. The method of reproducing sound from an elongated flexible record strip having sound tracks thereon in substantially parallel lines extending from edge to edge of the strip, which consists in bending said strip into curved shape so that opposite edges of the strip are closely adjacent with adjacent sound tracks in registry at the adjacent edges of the strip and positively moving said strip transversely and longitudinally in its curved shape over a reproducer unit of a sound amplifying system with said unit following the successive sound tracks across the abutting edges of the strip.

8. The method of reproducing sound from an elongated flexible sound record characterized by having sound tracks thereon extending in substantially parallel lines from edge to edge of the strip, which consists in providing a sound reproducing system inclusive of a sound pick-up unit positioned to take sound from said strip, in bending said strip into curved shape with sound tracks in registry, and in positively feeding said strip transversely and longitudinally with respect to the sound pick-up unit to provide continuing sound reproduction from successive tracks along said strip.

9. The method of reproducing sound from an elongated flexible sound record characterized by having sound tracks thereon extending in substantial parallelism from edge to edge of the strip, which consists in providing a sound reproducing system including a sound pick-up positioned to take sound from said strip at a predetermined point, in bending said strip into curved shape so that opposite edges of the strip are in abutment with sound tracks in registry, in positively feeding said strip transversely and longitudinally with respect to the sound pick-up unit to provide continuing sound reproduction from successive tracks along said strip, and in eliminating any audible indication of the passage of the sound pick-up from one sound track to another by silencing the reproducing system at the instant of passage.

10. The method of reproducing sound which consists in effecting engagement between a stylus and a flexible record strip having continuing sound tracks thereon in substantial parallelism from edge to edge of the strip, positioning said strip with successive sound tracks in registry, and in providing transverse and longitudinal feeding motion of said strip with respect to the stylus whereby the stylus follows successively the sound tracks of the strip.

JOHN RIPLEY KIEL.